US012647806B2

(12) United States Patent
Lukens et al.

(10) Patent No.: US 12,647,806 B2
(45) Date of Patent: Jun. 2, 2026

(54) METHODS AND SYSTEMS FOR 5G QUALITY MEASUREMENT

(71) Applicant: T-Mobile USA, Inc., Bellevue, WA (US)

(72) Inventors: Lance Paul Lukens, Templeton, CA (US); Shawn Wallace, Charles Town, WV (US)

(73) Assignee: T-Mobile USA, Inc., Bellevue, WA (US)

( * ) Notice: Subject to any disclaimer, the term of this patent is extended or adjusted under 35 U.S.C. 154(b) by 362 days.

(21) Appl. No.: 18/352,913

(22) Filed: Jul. 14, 2023

(65) Prior Publication Data

US 2025/0024281 A1     Jan. 16, 2025

(51) Int. Cl.
*H04W 24/04* (2009.01)
*H04W 24/08* (2009.01)

(52) U.S. Cl.
CPC .................................. H04W 24/08 (2013.01)

(58) Field of Classification Search
CPC ..... H04W 24/08; H04W 24/04; H04W 24/02; H04W 24/10
See application file for complete search history.

(56) References Cited

U.S. PATENT DOCUMENTS

2025/0126027 A1* 4/2025 Ju ........................... H04L 41/16

FOREIGN PATENT DOCUMENTS

CN          111310139 A  *  6/2020  ............. G06F 21/31

* cited by examiner

*Primary Examiner* — Said M Elnoubi
(74) *Attorney, Agent, or Firm* — Lee & Hayes, P.C.

(57) ABSTRACT

Methods and systems for measuring 5G communication quality are described herein. According to an implementation, a computer server may determine a plurality of subscribers where each corresponding user equipment carries at least one session on 5G new radio every first time period in a day. For each subscriber, the computer server may obtain data associated with second sessions carried on the corresponding user equipment during the first time period; extract, from the data, one or more features associated with the second sessions; and determine, using a machine learning model and based at least in part on the one or more features, a value being indicative of a likelihood that each subscriber is having a poor 5G network experience during the first time period. The computer server may further determine, based at least in part on the value, an overall 5G communication quality score of the plurality of subscribers.

17 Claims, 7 Drawing Sheets

500

A COMPUTER SYSTEM RECEIVES DATA ASSOCIATED WITH REAL-TIME SESSIONS CARRIED ON USER EQUIPMENT (UE) OF ALL FIFTH GENERATION (5G) ACTIVE SUBSCRIBERS OF A WIRELESS COMMUNICATION PROVIDER — 502

FOR EACH 5G ACTIVE SUBSCRIBER, THE COMPUTER SYSTEM ANALYZE THE REAL-TIME SESSIONS IN AN HOURLY BASIS — 504

FOR EACH 5G ACTIVE SUBSCRIBER, THE COMPUTER SYSTEM OBTAINS A SET OF FEATURES ASSOCIATED WITH REAL-TIME SESSIONS PER HOUR — 506

FOR EACH 5G ACTIVE SUBSCRIBER, THE COMPUTER SYSTEM INPUTS THE SET OF FEATURES TO A MACHINE LEARNING (ML) MODEL TO OBTAIN AN OUTPUT INCLUDING AN HOURLY PROBABILITY THAT EACH 5G ACTIVE SUBSCRIBER IS HAVING A POOR 5G NETWORK EXPERIENCE, THE ML MODEL BEING TRAINED USING HISTORICAL 5G DISABLEMENTS THAT WERE INVOKED BY CUSTOMERS — 508

THE COMPUTER SYSTEM OBTAINS A MONTHLY PROBABILITY THAT EACH 5G ACTIVE SUBSCRIBER IS HAVING A POOR 5G NETWORK EXPERIENCE BASED ON THE HOURLY PROBABILITY THAT EACH 5G ACTIVE SUBSCRIBER IS HAVING A POOR 5G NETWORK EXPERIENCE — 510

THE COMPUTER SYSTEM OBTAINS A 5G QUALITY INDICATOR SCORE FOR ALL 5G ACTIVE SUBSCRIBERS EVERY MONTH BASED ON THE MONTHLY PROBABILITY THAT EACH 5G ACTIVE SUBSCRIBER IS HAVING A POOR 5G NETWORK EXPERIENCE — 512

THE COMPUTER SYSTEM GENERATES A REPORT FOR NETWORK OPERATION TO ADDRESS POTENTIAL ISSUES AND FOR BUSINESS ANALYSIS — 514

500

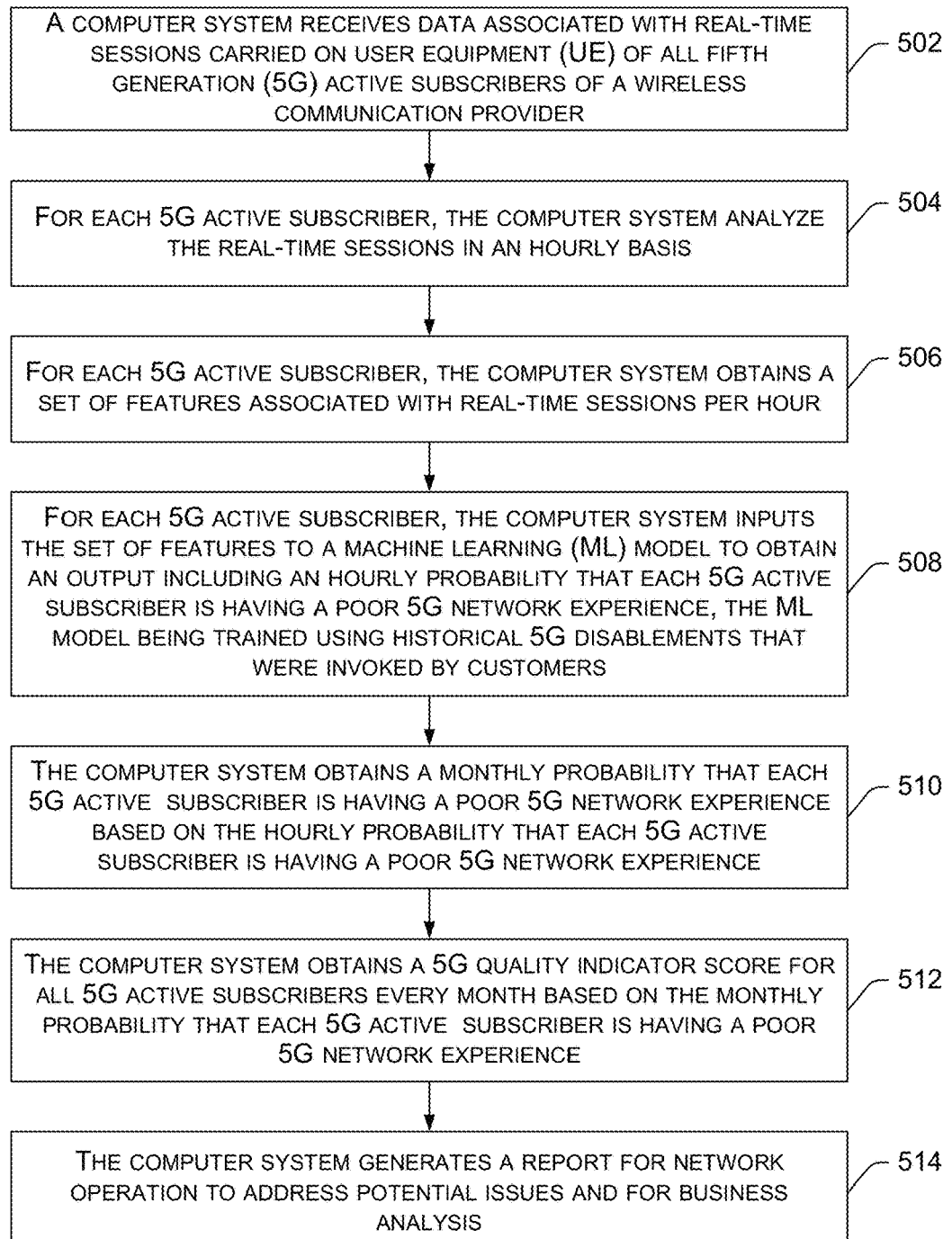

A COMPUTER SYSTEM RECEIVES DATA ASSOCIATED WITH REAL-TIME SESSIONS CARRIED ON USER EQUIPMENT (UE) OF ALL FIFTH GENERATION (5G) ACTIVE SUBSCRIBERS OF A WIRELESS COMMUNICATION PROVIDER — 502

FOR EACH 5G ACTIVE SUBSCRIBER, THE COMPUTER SYSTEM ANALYZE THE REAL-TIME SESSIONS IN AN HOURLY BASIS — 504

FOR EACH 5G ACTIVE SUBSCRIBER, THE COMPUTER SYSTEM OBTAINS A SET OF FEATURES ASSOCIATED WITH REAL-TIME SESSIONS PER HOUR — 506

FOR EACH 5G ACTIVE SUBSCRIBER, THE COMPUTER SYSTEM INPUTS THE SET OF FEATURES TO A MACHINE LEARNING (ML) MODEL TO OBTAIN AN OUTPUT INCLUDING AN HOURLY PROBABILITY THAT EACH 5G ACTIVE SUBSCRIBER IS HAVING A POOR 5G NETWORK EXPERIENCE, THE ML MODEL BEING TRAINED USING HISTORICAL 5G DISABLEMENTS THAT WERE INVOKED BY CUSTOMERS — 508

THE COMPUTER SYSTEM OBTAINS A MONTHLY PROBABILITY THAT EACH 5G ACTIVE SUBSCRIBER IS HAVING A POOR 5G NETWORK EXPERIENCE BASED ON THE HOURLY PROBABILITY THAT EACH 5G ACTIVE SUBSCRIBER IS HAVING A POOR 5G NETWORK EXPERIENCE — 510

THE COMPUTER SYSTEM OBTAINS A 5G QUALITY INDICATOR SCORE FOR ALL 5G ACTIVE SUBSCRIBERS EVERY MONTH BASED ON THE MONTHLY PROBABILITY THAT EACH 5G ACTIVE SUBSCRIBER IS HAVING A POOR 5G NETWORK EXPERIENCE — 512

THE COMPUTER SYSTEM GENERATES A REPORT FOR NETWORK OPERATION TO ADDRESS POTENTIAL ISSUES AND FOR BUSINESS ANALYSIS — 514

Figure 6:
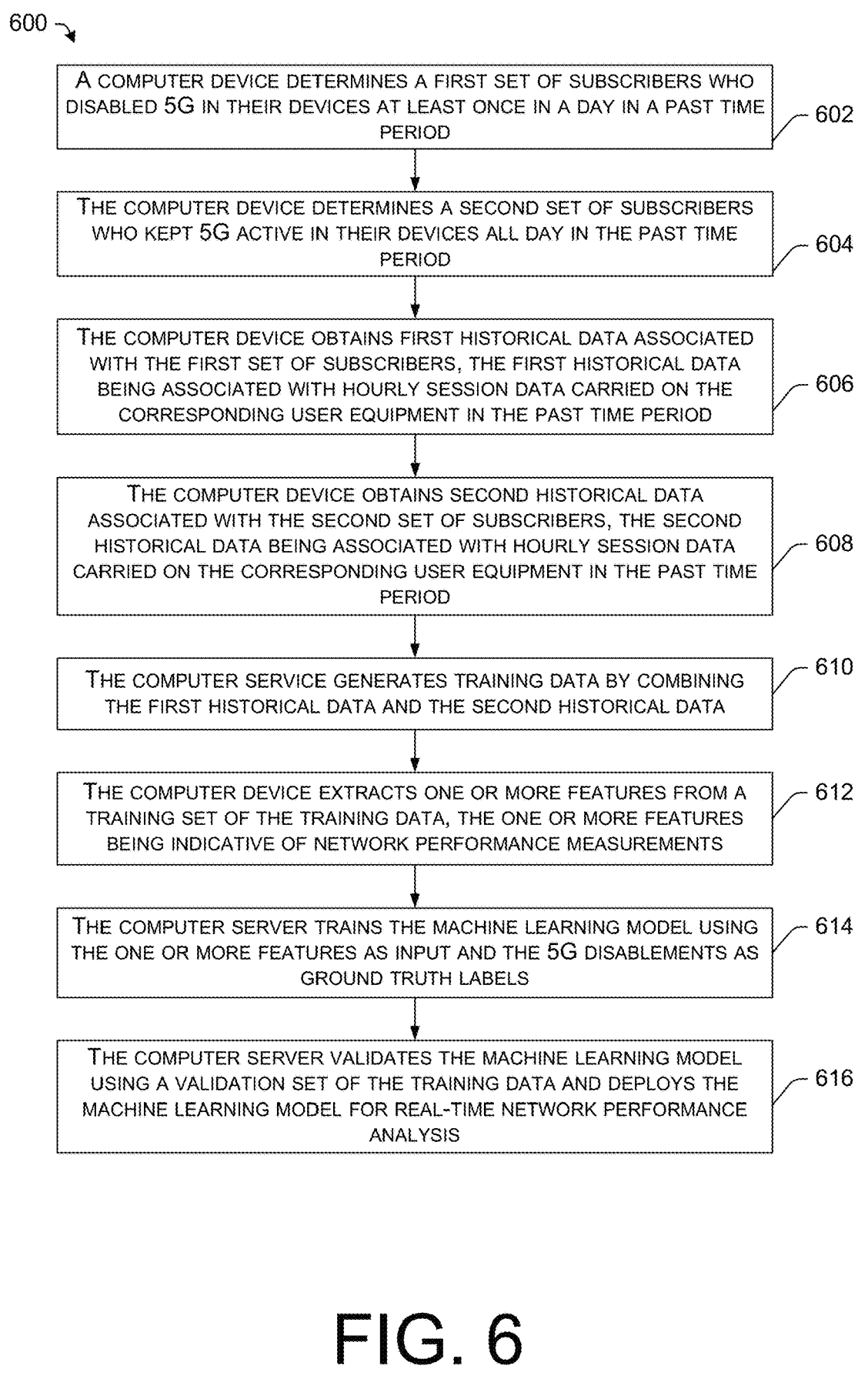

```
┌─────────────────────────────────────────────────────────────┐
│ A COMPUTER DEVICE DETERMINES A FIRST SET OF SUBSCRIBERS WHO  │
│ DISABLED 5G IN THEIR DEVICES AT LEAST ONCE IN A DAY IN A PAST│── 602
│ TIME PERIOD                                                  │
└─────────────────────────────────────────────────────────────┘
                              │
                              ▼
┌─────────────────────────────────────────────────────────────┐
│ THE COMPUTER DEVICE DETERMINES A SECOND SET OF SUBSCRIBERS   │
│ WHO KEPT 5G ACTIVE IN THEIR DEVICES ALL DAY IN THE PAST TIME │── 604
│ PERIOD                                                       │
└─────────────────────────────────────────────────────────────┘
                              │
                              ▼
┌─────────────────────────────────────────────────────────────┐
│ THE COMPUTER DEVICE OBTAINS FIRST HISTORICAL DATA ASSOCIATED │
│ WITH THE FIRST SET OF SUBSCRIBERS, THE FIRST HISTORICAL DATA │
│ BEING ASSOCIATED WITH HOURLY SESSION DATA CARRIED ON THE     │── 606
│ CORRESPONDING USER EQUIPMENT IN THE PAST TIME PERIOD         │
└─────────────────────────────────────────────────────────────┘
                              │
                              ▼
┌─────────────────────────────────────────────────────────────┐
│ THE COMPUTER DEVICE OBTAINS SECOND HISTORICAL DATA           │
│ ASSOCIATED WITH THE SECOND SET OF SUBSCRIBERS, THE SECOND    │
│ HISTORICAL DATA BEING ASSOCIATED WITH HOURLY SESSION DATA    │── 608
│ CARRIED ON THE CORRESPONDING USER EQUIPMENT IN THE PAST TIME │
│ PERIOD                                                       │
└─────────────────────────────────────────────────────────────┘
                              │
                              ▼
┌─────────────────────────────────────────────────────────────┐
│ THE COMPUTER SERVICE GENERATES TRAINING DATA BY COMBINING    │── 610
│ THE FIRST HISTORICAL DATA AND THE SECOND HISTORICAL DATA     │
└─────────────────────────────────────────────────────────────┘
                              │
                              ▼
┌─────────────────────────────────────────────────────────────┐
│ THE COMPUTER DEVICE EXTRACTS ONE OR MORE FEATURES FROM A     │── 612
│ TRAINING SET OF THE TRAINING DATA, THE ONE OR MORE FEATURES  │
│ BEING INDICATIVE OF NETWORK PERFORMANCE MEASUREMENTS         │
└─────────────────────────────────────────────────────────────┘
                              │
                              ▼
┌─────────────────────────────────────────────────────────────┐
│ THE COMPUTER SERVER TRAINS THE MACHINE LEARNING MODEL USING  │── 614
│ THE ONE OR MORE FEATURES AS INPUT AND THE 5G DISABLEMENTS AS │
│ GROUND TRUTH LABELS                                          │
└─────────────────────────────────────────────────────────────┘
                              │
                              ▼
┌─────────────────────────────────────────────────────────────┐
│ THE COMPUTER SERVER VALIDATES THE MACHINE LEARNING MODEL     │
│ USING A VALIDATION SET OF THE TRAINING DATA AND DEPLOYS THE  │── 616
│ MACHINE LEARNING MODEL FOR REAL-TIME NETWORK PERFORMANCE     │
│ ANALYSIS                                                     │
└─────────────────────────────────────────────────────────────┘
```

PROCESSOR(S)
702

MEMORY 704

ML MODEL DEPLOYMENT MODULE
706

SESSION DATA OBTAINING MODULE
708

FEATURE ANALYSIS MODULE
710

5G QUALITY MEASUREMENT MODULE
712

. . .

DISPLAY
714

COMMUNICATION INTERFACE(S)
718

INPUT/OUTPUT DEVICE(S)
716

MACHINE READABLE MEDIUM
720

METHODS AND SYSTEMS FOR 5G QUALITY MEASUREMENT

BACKGROUND

Customers of a wireless service provider sometimes report that they have a better network experience in the long-term evolution (LTE) network than the fifth generation (5G) network due to their locations, time of the day, or low network coverage. As a result, the customers may have disabled the 5G cellular option on their devices and opted for LTE instead.

Currently, network engineering has 5G customer experience measuring models that are rule-based and limited by predefined thresholds. These customer experience measuring models may not handle changes and trends in data effectively, leading to in accuracies in the analysis of the network performance and the impacts to the customers' 5G experience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 illustrates an example flowchart for measuring 5G quality, according to an example of the present disclosure.

FIG. 6 illustrates an example flowchart for training the ML model for 5G quality measurement, according to an example of the present disclosure.

DETAILED DESCRIPTION

Figure 1:
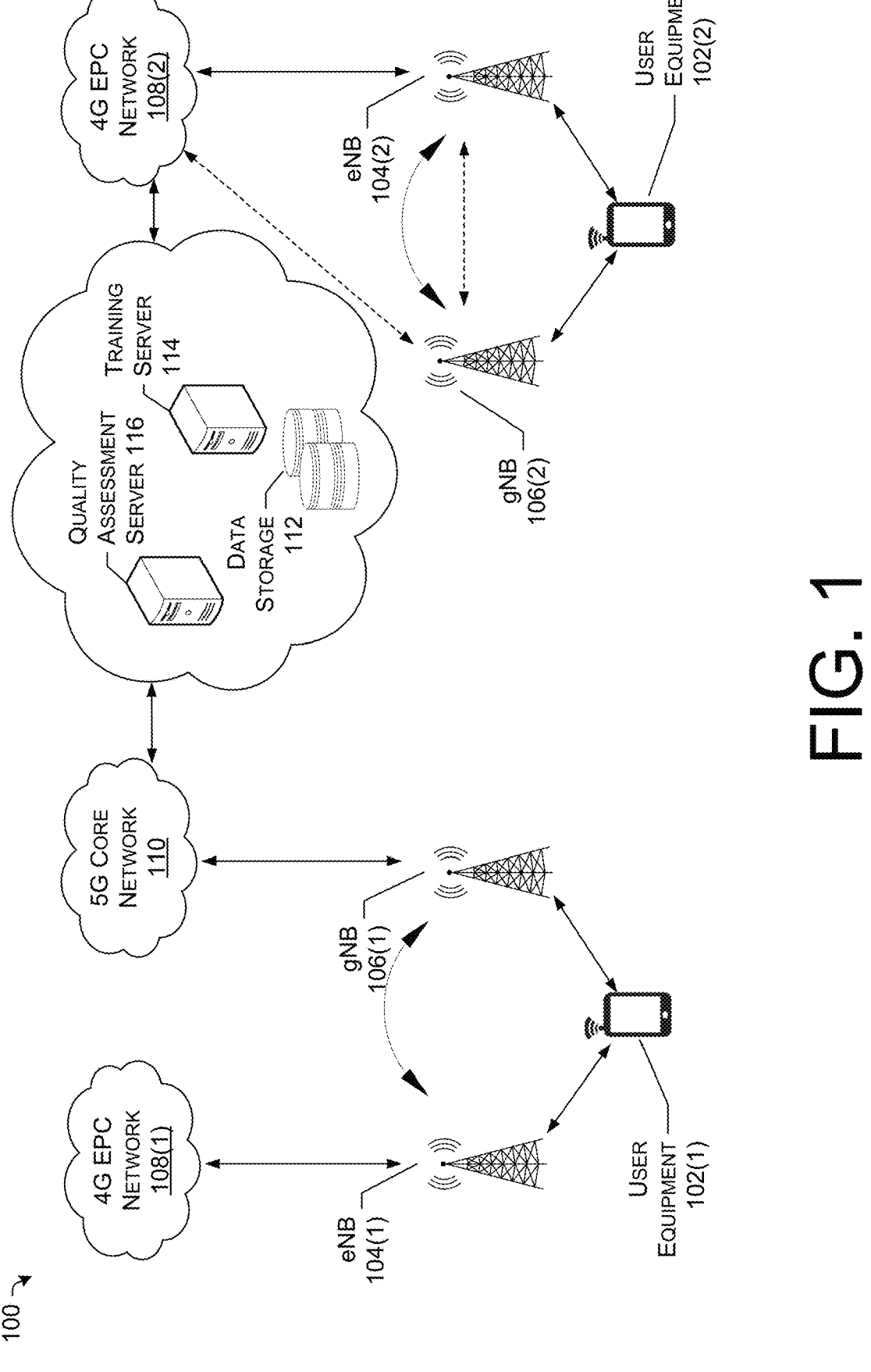
FIG. 1 illustrates an example network scenario, in which methods for 5G quality measurement is implemented, according to an example of the present disclosure.

Techniques for measuring 5G communication quality in a wireless communication network, are disclosed herein.

In implementations, a computer server may determine a plurality of subscribers from all service subscribers of a wireless communication provider. For each subscriber, the corresponding user equipment carries at least one session on 5G new radio (NR) every first time period in a day. For each subscriber, the computer server may obtain data associated with second sessions carried on the corresponding user equipment during the first time period. The computer server may extract, from the data, one or more features associated with the second sessions. Further, the computer server may determine, using a machine learning model and based at least in part on the one or more features, a value being indicative of a likelihood that each subscriber is having a poor 5G network experience during the first time period. The value may also indicate the likelihood that the subscriber will disable 5G due to the poor 5G network experience.

The computer server may further determine, based at least in part on the value, an overall 5G communication quality score of the plurality of subscribers. In implementations, the first time period may be one hour. The overall 5G communication quality score of the plurality of subscribers may be an average 5G communication quality score in one hour, in a day, or in a month determined based on the value being indicative of the likelihood that each subscriber is having a poor 5G network experience per hour.

In implementations, the machine learning model is trained by performing various operations based on historical 5G disablement data. The training may be performed on a computer device different from the computer server for real-time 5G quality measurement. In some examples, the training may be performed on the same computer server for real-time 5G quality measurement. The computer device may determine a first set of subscribers, each of which, disabled 5G on corresponding user equipment at least once in a day, and obtain from a data storage, a first set of hourly session data carried on the corresponding user equipment of the first set of subscribers in the day. The computer device may further identify, from the first set of hourly session data, an hour session data prior to disabling 5G; label the hour session data with a first indicator; and label other hour session data prior to the hour session data in the first set of hourly session data with a second indicator different from the first indicator.

In some examples, the computer device may further determine a second set of subscribers, each of which, kept 5G active on corresponding user equipment an entire day (or relevant time period). The computer device may obtain, from the data storage, a second set of hourly session data carried on the corresponding user equipment of the second set of subscribers during the entire day; and label each hourly session data of the second set of hourly session data with the second indicator.

In some examples, the computer device may further generate training data by combining the first set of hourly session data and the second set of hourly session data. The computer device may generate a training set from the training data; and extract one or more second features from the training set. The one or more second features can be input to the machine learning model to obtain an output from the machine learning model, the output being indicative of a probability that the subscribers were having poor 5G network experiences in the past time period. The computer device may further generate a validation set from the training data; and validating the output of the machine learning model using the validation set.

In implementations, the one or more features include at least one of a location of the user equipment, a time associated with the second sessions, whether the user equipment is using a standalone (SA) mode or a one-standalone (NSA) mode, a type of radio access technology (RAT), a packet latency from the user equipment to a domain name server (DNS), per cell measurement data, or an original equipment manufacturer (OEM) of the user equipment.

The present disclosure uses a machine learning model to score the customer experience on 5G network. In implementations, various classification models may be implemented such as binary classification model, multi-class classification model, multi-label classification model, etc. The present disclosure trains the machine learning model based on historical 5G disablements invoked by the customer. The training uses the network performance measurements as feature inputs and the historical 5G disablements as the truth set/labels. Evaluating 5G communication quality by using the trained machine learning model can adapt better to changes and trends in the real-time session data than existing rule-based 5G quality measurement scheme. Further, the machine learning model can process and analyze a large amount of data in real-time, thus, providing a more comprehensive and accurate view of the network performance compared to the rule-based 5G quality measurement scheme.

The techniques discussed herein may be implemented in a computer network using one or more of protocols including but are not limited to Ethernet, 3G, 4G, 4G/LTE, 5G, 6G, the further radio access technologies, or any combination thereof. In some examples, the network implementations may support standalone architectures, non-standalone architectures, dual connectivity, carrier aggregation, etc. Example implementations are provided below with reference to the following figures.

FIG. 1 illustrates an example network scenario, in which methods for 5G quality measurement is implemented, according to an example of the present disclosure.

The network scenario 100, as illustrated in FIG. 1 may be part of a telecommunication network of a wireless service provider such as, T-Mobile, AT&T, Verizon Wireless, etc. The telecommunication network may include one or more packet core networks, one or more IP multimedia subsystems (IMSs), and one or more access networks through which, user equipment can connect to the one or more packet core networks and the IMSs. The packet core network may include a 4G evolved packet core (EPC) network, e.g., 108(1), or 108(2) (hereinafter referred to as 4G EPC 108) or a 5G core network 110. The one or more access networks may be compatible with one or more radio access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunication System (UMTS) technology, Code Division Multiple Access (CDMA) technology, Global System for Mobile Communications (GSM) technology, WiMAX technology, Wi-Fi technology, and/or any other previous or future generation of radio access technology.

The one or more access networks may include various types of base stations, for example, 2G base stations and/or 3G NodeBs that are associated with GSM and CDMA access network, eNB 104(1) and 104(2) (hereinafter referred to as eNB 104) that are associated with an LTE access network known as an Evolved UMTS Terrestrial Radio Access Network (E-UTRAN), or gNB 106(1) and 106(2) (hereinafter referred to as gNB 106) as new radio (NR) base stations that are associated with a 5G access network.

User equipment 102(1) and 102(2)(hereinafter referred to as user equipment 102) may connect to 4G EPC network 108 through eNB 104 or connect to 5G core network 110 through gNB 106. In some examples, the user equipment 102 may connect to the 5G core network in a standalone mode (e.g., user equipment 102(1)) or a non-standalone mode (e.g., user equipment 102(2). The user equipment 102 may be a mobile device, such as a cellular phone or a smart phone. In some examples, the UE 102 may be a personal digital assistant (PDA), a media player, a tablet computer, a gaming device, computing devices implemented on the vehicle such as an autonomous vehicle or a self-driving vehicle, etc. In some other examples, the UE 102 may be a virtual reality device or a wearable device such as, a smart watch, smart glasses, etc.

After the user equipment 102 registers through the IMS network, one or more sessions may be generated to provide end-to-end user plane connectivity between applications on the user equipment 102 and the 4G EPC network 108 or the 5G core network 110. In some examples, the one or more sessions may include one or more packet data network (PDN) sessions carried on the 4G EPC network 108 or the 5G core network 110, hereafter referred to as 4G session or 5G session. When 5G connection is available, the user equipment 102 of a customer who subscribed to 5G data service may connect to 5G network. One or more 5G sessions may further be established between various applications on the user equipment 102 and the 5G core network 110. In some examples when the 5G connection is unavailable or nearly unusable, the user equipment 102 may automatically switch to LTE connection, causing those active 5G sessions to be switched to LTE sessions.

However, some customers report that they have a better network experience on LTE than 5G due to locations, time, low coverage, etc. These customers have chosen to disable 5G cellular on their user equipment and use LTE instead. To improve the customers' experience on 5G, the present disclosure utilizes data transmitted from the user equipment during the sessions and trains a machine learning model based on the data to predict a likelihood that the customer is experiencing poor 5G connection. The data associated with the sessions is transmitted to the 5G core network 110 and saved in a data storage 112. A training server 114 may periodically retrieve the data from the data storage 112 and train a machine learning model based on the data to predict a network issue probability. In some examples, the training of the machine learning model may be based on daily data associated with the 5G customers who have kept 5G connection active the entire day and the 5G customers who have disabled their 5G connection at least once a day. The trained machine learning model may be deployed on a quality assessment server 116. In implementations, the quality assessment server 116 may use the machine learning model trained by the training server 114 to predict a network issue probability every hour during a day. The quality assessment server 116 may further aggregate the predictions and generate the 5G quality assessment in a certain time period, e.g., daily, monthly, etc.

Compared to the current rule-based threshold logic for monitoring the network performance, the present disclosure uses the machine learning model trained based on historical 5G disablements invoked by the customers. Network performance measurements are taken as the features to input to the machine learning model. In addition, the historical 5G disablements are used as the truth set and to label the training data. The trained machine learning model can adapt better to changes and trends in the real-time data and can identify patterns and anomalies more efficiently. The ability to learn and adapt also makes the machine learning model more robust and capable of handling complex and dynamic network performance issues, compared to the current rule-based threshold logic.

It should be understood that the network scenario 100 as shown in FIG. 1 is for illustrative purposes. The quality assessment server 116, the training server 114, and the data storage 112, individually or in combination, may be located in a cloud environment coupled to the packet core network, e.g., the 4G EPC network 108 and the 5G core network 110.

The techniques discussed herein may be implemented in the telecommunication network using one or more of protocols including but are not limited to Ethernet, 3G, 4G, 4G LTE, 5G, or any combination thereof. The techniques may be implemented in the telecommunication network using 6G and/or future radio access technologies.

Figure 2:
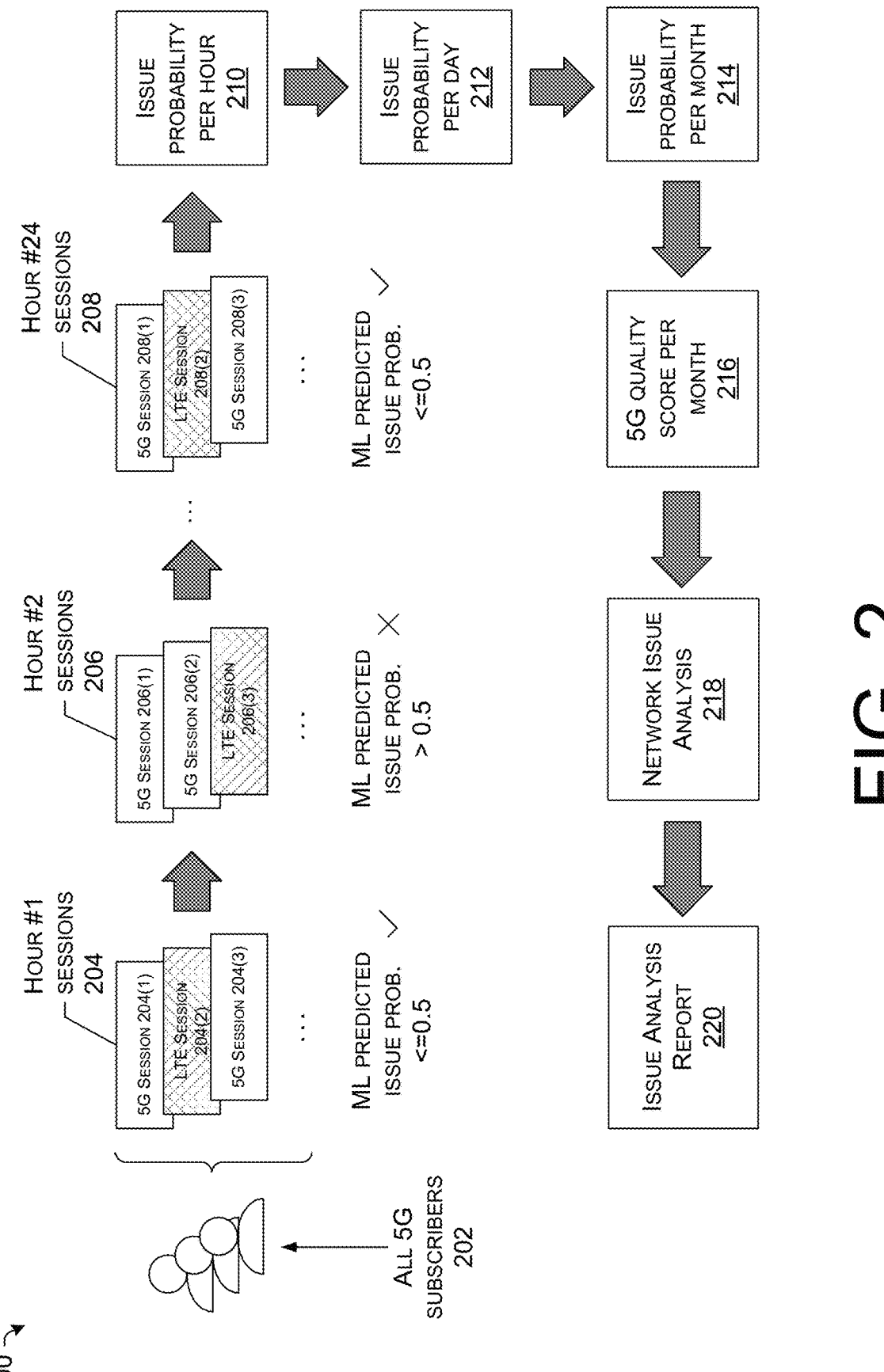
FIG. 2 illustrates an example process flow of 5G quality measurement, according to an example of the present disclosure.

FIG. 2 illustrates an example process flow of 5G quality measurement, according to an example of the present disclosure. The example process flow 200 may be implemented on the quality assessment server 116 of FIG. 1 and based on the sessions associated with all active 5G subscribers 202 of a wireless communication provider. As discussed herein, a 5G subscriber being 5G active indicates that the subscriber connects through 5G NR one or more times a day.

For each active 5G subscriber, all sessions carried on the user equipment are monitored in real-time and evaluated hourly. As discussed herein, a session is called a 5G session if upon the session is created, the user equipment is connected to through 5G NR, and a session is called an LTE session if upon the session is created, the user equipment is connected through LTE. FIG. 2 illustrates the hourly sessions associated with an active 5G subscriber. As illustrated, hour #1 sessions 204 may include a 5G session 204(1), an LTE session 204(2), a 5G session 204(3) with the 5G session 204(1) occurred at an earliest time. At a later time, the user equipment switches the connection from 5G to LTE, causing a subsequent session being created between the user equipment and the 4G EPC network, or a current 5G session being switched to an LTE session. The user equipment may further switch back to 5G connection, causing a subsequent session being created between the user equipment and the 5G core network, or a current LTE session being switched to a 5G session.

Figure 3:
FIG. 3 illustrates an example process flow of training a machine learning (ML) model for 5G quality measurement, according to an example of the present disclosure.

Further, Hour #2 sessions 206 may include a 5G session 206(1), a 5G session 206(2), and an LTE session 206(3), and Hour #3 sessions 208 may include a 5G session 208(1), an LTE session 208(2), and a 5G session 208(3). The type of individual session depends on the radio access technology (RAT) being used to connect the user equipment and the packet core network at the moment the individual session being active. In implementations, an active session carried on 5G new radio may be switched to LTE, 3G, or other RATs. In some examples, the subscriber is 5G active in one hour if the user equipment carries at least one 5G session in the hour. The subscriber is 5G inactive if the user equipment carries only LTE sessions in one hour. As illustrated in FIG. 3, Hour #1 sessions 204 include two 5G sessions 204(1) and 204(3), Hour #2 sessions 206 include two 5G sessions 206(1) and 206(2), and Hour #3 sessions 208 include two 5G sessions 208(1) and 208(2). Thus, the subscriber is 5G active in Hour #1, Hour #2, and Hour #3.

In some examples, the quality assessment server 116 may analyze data associated with all sessions per hour and extract a plurality features from the hourly session data. In some examples, the hourly session data may include aggregated information associated with each session in the hour. The quality assessment server 116 may input the plurality of features associated with the hourly session data to a machine learning model to predict a network issue probability per hour for each active 5G subscriber. For example, based on the inputted plurality of features, the ML predicted issue probability for Hour #1 is less than or equal to 0.5, the ML predicted issue probability for Hour #2 greater than or equal to 0.5, and the ML predicted issue probability for Hour #3 is less than or equal to 0.5. If a threshold for a network issue is set as 0.5, the 5G active subscriber may encounter some network issues during Hour #2 and may be more likely to disable 5G connection.

In some examples, the machine learning model may use a binary classification model, which may convert the probability output to a binary output. For example, a probability output greater than 0.5 may be converted to an output value 1, which indicates the subscriber is experiencing poor network connection and is likely to disable 5G; and a probability output equal to or less than 0.5 may be converted to an output value 0, which indicates the subscriber is not experiencing poor network connection.

By way of example and without limitation, the features associated with the hourly session data may include location data in the hour, time data in the hour, total data transmitted in 5G NR standalone (SA) mode, total data transmitted in 5G NR non-standalone (NSA) mode in the hour, total data transmitted in 3G, 4G and 5G in the hour, a count of total LTE sessions in the hour, a count of total 5G sessions in the hour, a count of total 5G NSA sessions in the hour, packet latency from the user equipment to a domain name server (DNS) in the hour, strength of received 5G NR and LTE reference signals in the hour, per call measurement data in the hour, a count of mid-band (e.g., 1 GHz-6 GHz) in the hour, a count of low-band (e.g., <1 GHz) in the hour, combined network usage in the hour, device manufacturer information of the user equipment, etc.

The quality assessment server 116 may further determine an issue probability per hour 210, an issue probability per day 212 based on the issue probability per hour 210 for all hours during a day, and an issue probability per month 214 based on the issue probability per day 212 for all days during a month for all 5G active subscribers. The issue probability per hour 210 may indicate an average likelihood that the 5G active subscribers are having a poor 5G network experience in one hour, the issue probability per day 212 may indicate an average likelihood that the 5G active subscribers are having a poor 5G network experience in the day, and the issue probability per month 214 may indicate an average likelihood that the 5G active subscribers are having a poor 5G network experience in the month. Based on the issue probability per month 214, the quality assessment server 116 may determine a 5G quality score per month 216 for all 5G active subscribers. In some examples, the 5G quality score per month 216=1−the issue probability per month 214. That is, if the ML prediction indicates a high network issue probability, the 5G quality score is expected to be low; and if the ML prediction indicates a low network issue probability, the 5G quality score is expected to be high.

In implementations, the issue probability per month 214 and the 5G quality score per month 216 may be provided to network issue analysis 218 to further identify the patterns associated with those issues. For example, some network issues may occur more often in a specific area and/or during a specific time period. In another example, some network issues may be often seen in user equipment of certain manufacturers. In yet another example, some network issued may be caused by a long DNS latency. An issue analysis report 220 may be generated and further provided to business unit. In implementations, the issue analysis report 220 may be used to further analyze the impact of the 5G quality on the monthly churn rate and adjust the provider's marketing strategies.

FIG. 3 illustrates an example process flow of training a machine learning (ML) model for 5G quality measurement, according to an example of the present disclosure. The example process flow 300 may be implemented on the training server 114 of FIG. 1 and based at least in part on historical 5G disablements invoked by the 5G subscribers.

In implementations, the training server 114 may obtain historical data associated with the historical 5G disablements from the data storage 112 shown in FIG. 1. Based on the historical data, the training server 114 may create two groups of subscribers. A group of type A subscriber 302 includes subscribers that have disabled 5G at least once in a day. A group of type B subscriber 304 includes subscribers that have kept 5G active the entire day. For each group, the training server 114 may obtain hourly session data for each subscriber included therein. The training server 114 may extract a plurality of features associated with the hourly session data and use the plurality of features 318 as input to the machine learning model 320.

In implementations, the training server 114 may label the hourly session data and associated the labels with the plurality of features 318. For the group of type B subscriber 304, as every hour of the day has at least one active 5G session, the training server 114 may label the hourly session data using label "0." As illustrated in FIG. 3, the hourly session data of Hour #1 sessions 312, Hour #2 sessions 314, and Hour #3, . . . , 24 sessions 316 in a day is labeled with "0." For the group of type A subscriber 302, the training server 114 may identify a particular hour, during which, a subscriber disabled 5G in the user equipment and opted for LTE for the rest of the day. The training server 114 may label the hourly session data prior to the particular hour, e.g., the hourly session data in Hour #1 sessions 306, using label "0" and the hourly session data in the particular hour, e.g., Hour #2 sessions 308, using label "1." The hourly session data after the particular hour, e.g., Hour #3, . . . , 24 sessions 310 is not labeled and not used for training. The training server 114 may use the plurality of features 318 with carried respective labels as input to the machine learning model 320. With the historical disablement data as the true set and/or labels, the training server 114 may validate the output 320 of the machine learning model.

As discussed herein with respect to FIG. 2, the features associated with the hourly session data are also used for network performance evaluation. By using the features extracted from the past 5G disablements invoked by the customers, particularly, the features associated with the hourly session data at the time 5G was disabled and/or the hourly session data right before the time 5G was disabled, the machine learning model can be trained to learn the most important features that impact the overall predictions. The predictions of the machine learning model may be further used to identify the patterns of the network issues and help fix the network issues, thus, lowering churn and incoming calls to report or resolve the issues.

Figure 4:
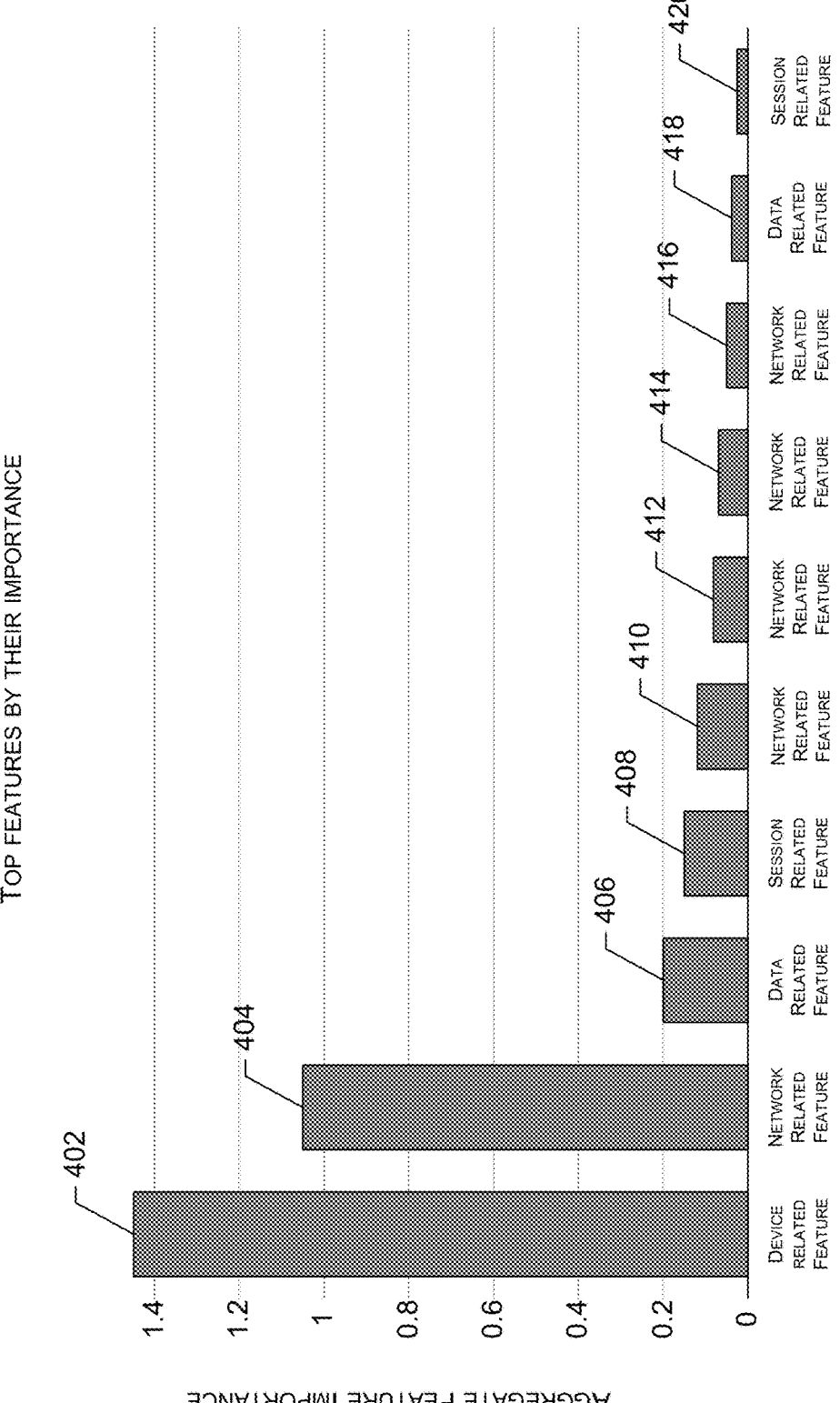
FIG. 4 illustrates example important features that impact the performance of the ML model for 5G quality measurement, according to an example of the present disclosure.

FIG. 4 illustrates example important features that impact the performance of the ML model for 5G quality measurement, according to an example of the present disclosure. Various features, among all the features described above associated with the hourly session data, play more important roles in the performance of the ML model for 5G quality measurement. These features may be related to mobile devices, network elements/performance, data usage, sessions, etc. FIG. 4 shows ten most important features that impact the performance of the machine learning model, i.e., the predicted probability as to whether the subscriber has poor network experience and is likely to disable 5G. As shown in FIG. 4, feature 402 may be a device related feature such as device manufacturer, feature 404 may be a network related feature such as DNS latency, feature 406 may be a data related feature such as daily payload, feature 408 may be a session related feature such as LTE sessions, feature 410 may be a network related feature such as 5G NR NSA, feature 412 may be a network related feature such as mid-band count, feature 414 may be a network related feature such as low-band count, feature 416 may be a network related feature such as 5G & LTE reference signal received power, feature 418 may be a data related feature such as total PCMD, and feature 420 may be a session related feature such as session count.

FIG. 5 illustrates an example flowchart for measuring 5G quality, according to an example of the present disclosure. The operations following the example flowchart 500 may be performed by the quality assessment server 116 of FIG. 1. The operations following the example flowchart 500 may be further associated with the example process flow 200 of FIG. 2.

At operation 502, a computer system may receive data associated with real-time sessions carried on user equipment (UE) of all 5G active subscribers of a wireless communication provider. In implementations, the real-time 5G sessions may be monitored by one or more 5G core network functions such as, access and mobility function (AMF), session management function (SMF), user plane function (UPF), etc. The computer system may receive the data associated with the real-time 5G sessions from the one or more 5G core network functions. In some examples, data associated with the real-time 5G sessions are saved in a data storage, e.g., data storage 112 of FIG. 1. The computer system may obtain the data associated with the real-time 5G sessions from the data storage in a preset time period, e.g., hourly.

In some examples, the real-time LTE sessions are monitored by one or more entities in 4G EPC network such as mobility management entity (MME), PDN gateway (PGW), serving gateway (SGW), etc. The computer system may receive the data associated with the real-time LTE sessions from the one or more entities in 4G EPC network. Alternatively, the computer system may obtain the data associated with the real-time LTE sessions from the data storage in a preset time period, e.g., hourly.

In yet some examples, the 5G core network function and the 4G EPC network entity that perform similar functions may be integrated as one network function or entity. For example, AMF in 5G core network and MME in 4G EPC network may be implemented in one network element. The computer server may receive data associated with the real-time sessions (e.g., 5G sessions, LTE session, etc.) from the network element.

In yet some examples, the real-time sessions may also include sessions established over 3G or RATs other than 4G LTE or 5G NR. Those session data may also be monitored through the network entities of 4G EPC network, the network functions of 5G core network, or the combination thereof.

At operation 504, for each 5G active subscriber, the computer system may analyze the real-time session in an hourly basis. In some examples, the real-time sessions in one hour may include one or more of 5G sessions, or LTE sessions. The computer system may analyze each 5G session and LTE session for one hour. Alternatively, or additionally, the computer system may identity each LTE session and analyze at least one 5G session prior to the LTE session. In some examples, the hourly session data that includes a switch from 5G session to LTE session may be assigned with more weight in further evaluation.

At operation 506, for each 5G active subscriber, the computer system may obtain a set of features associated with real-time sessions per hour. The set of features associated with the real-time sessions indicate various aspects of the network performance measurements such as the packet latency from UE to DNS, the count of different types of sessions, the amount of data transmitted, the type of bandwidth, whether the UE is on 5G NR standalone mode or non-standalone mode, UE device original equipment manufacturer (OEM) information, etc. As discussed herein, the computer system may obtain the set of features based on all real-time sessions in the hour. Some of the features may indicate an average measurement/count for all the sessions in the hour. Alternatively, or additionally, features extracted from individual session in an hour may be assigned with different weights. For example, one or more 5G sessions prior to an LTE session may be assigned with more weight.

At operation 508, for each 5G active subscriber, the computer system may input the set of features to a machine learning model to obtain an output including an hourly probability that each 5G active subscriber is having a poor 5G network experience, the ML model being trained using historical 5G disablements that were invoked by customers. In implementations, prior to inputting the set of features to the ML model, the computer system may prune some unimportant features from the set of features to improve the efficiency and accuracy of the ML model prediction result. In some examples, the output of the ML model may indicate an hourly probability averaged over all 5G active subscribers. The hourly probability then indicates an average likelihood that the 5G subscribers are having a poor 5G network experience and will disable 5G in their user equipment.

At operation 510, the computer system may obtain a monthly probability that each 5G active subscriber is having a poor 5G network experience based on the hourly probability that each 5G active subscriber is having a poor 5G network experience. In some examples, the monthly probability may also indicate an average probability averaged over all 5G active subscribers and the days during each month.

At operation 512, the computer system may obtain a 5G quality indicator score for all 5G active subscribers every month based on the monthly probability that each 5G active subscriber is having a poor 5G network experience. As discussed herein, the higher the monthly probability that the 5G active subscriber is having a poor 5G network experience, the poor the 5G quality indicator score. The monthly probability or the monthly 5G quality indicator score may be further used for network issue analysis and/or customer experience analysis.

At operation 514, the computer system may generate a report for network operation to address potential issues and for business analysis. In some examples, hourly, daily, and/or monthly predictions from the ML model may be used to determine the patterns of network issues and to fix the network issues. In some examples, the business unit may utilize the monthly predictions from the ML model or the monthly 5G quality indicator score to analyze the churn rate and determine future marketing strategies.

FIG. 6 illustrates an example flowchart for training the ML model for 5G quality measurement, according to an example of the present disclosure. The operations following the example flowchart 600 may be performed by the training server 114 of FIG. 1. The operations following the example flowchart 600 may be further associated with the example process flow 300 of FIG. 3.

At operation 602, a computer device may determine a first set of subscribers who disabled 5G in their devices at least once in a day in a past time period. As discussed herein, the subscriber from the first set may disable 5G in the user equipment and opt for LTE, 3G, or other RATs, and remain 5G inactive for the rest of the day. Alternatively, the subscriber from the first set may disable 5G in the user equipment but may resume 5G during the day.

At operation 604, the computer device may determine a second set of subscribers who kept 5G active in their devices all day in the past time period.

At operation 606, the computer device may obtain first historical data associated with the first set of subscribers, the first historical data being associated with hourly session data carried on the corresponding user equipment in the past time period.

As discussed herein, an hourly session data may include various characters of the user equipment and the network performance measurements related to one or more sessions in an hour. When the sessions in an hour have at least one 5G session, the subscriber is considered as 5G active in the hour. As discussed herein, the first set of subscribers were 5G active per hour but later disabled 5G and opted to LTE in their user equipment. Thus, all the sessions carried on the user equipment afterwards were on LTE connection. Subscribers in the first set may have kept LTE connection until the end of the day or enabled 5G again during the day.

In some examples, the computer device may label the hourly session data during a 5G active hour as "0." The computer device may identify a particular hour that includes the last 5G session. That is, the subscriber disabled 5G at the end of the particular hour and kept 5G disabled for the rest of the day. The computer device may label the hourly session data during the 5G disablement hour as "1." The hourly session data in the hours after 5G disablement is not used for ML training and is not labeled herein.

At operation 608, the computer device may obtain second historical data associated with the second set of subscribers, the second historical data being associated with hourly session data carried on the corresponding user equipment in the past time period.

As for the second set of subscribers, 5G connection maintained active each hour during the day, the computer device may label the hourly session data each hour as "1."

As discussed herein, the computer device may obtain the first historical data and the second historical data from a data storage, e.g., the data storage 112 shown in FIG. 1.

At operation 610, the computer device may generate training data by combining the first historical data and the second historical data. As the computer device labels the session data based on the historical 5G disablements, the training data obtained is labeled training data that include a ground truth set.

At operation 612, the computer device may extract one or more features from a training set of the training data, the one or more features being indicative of network performance measurements. The one or more features may be similar to the features discussed above with respect to predictions using the ML model. As discussed herein, the one or more features used for ML training may have a larger dimension than those used for real-time 5G quality measurement.

At operation 614, the computer device may train the machine learning model using the one or more features as input and the 5G disablements as ground truth labels. In implementations, the training of the machine learning model may include iterative operations to adjust one or more parameters of the algorithms being used.

At operation 616, the computer device may validate the machine learning model using a validation set of the training data and deploys the machine learning model for real-time network performance analysis. The computer device may compare the output of the machine learning model with the labeled session data in the validation set and determine a deviation value. Once the deviation value satisfies a preset threshold, the machine learning model may be deployed in the network to perform real-time performance analysis.

Figure 7:
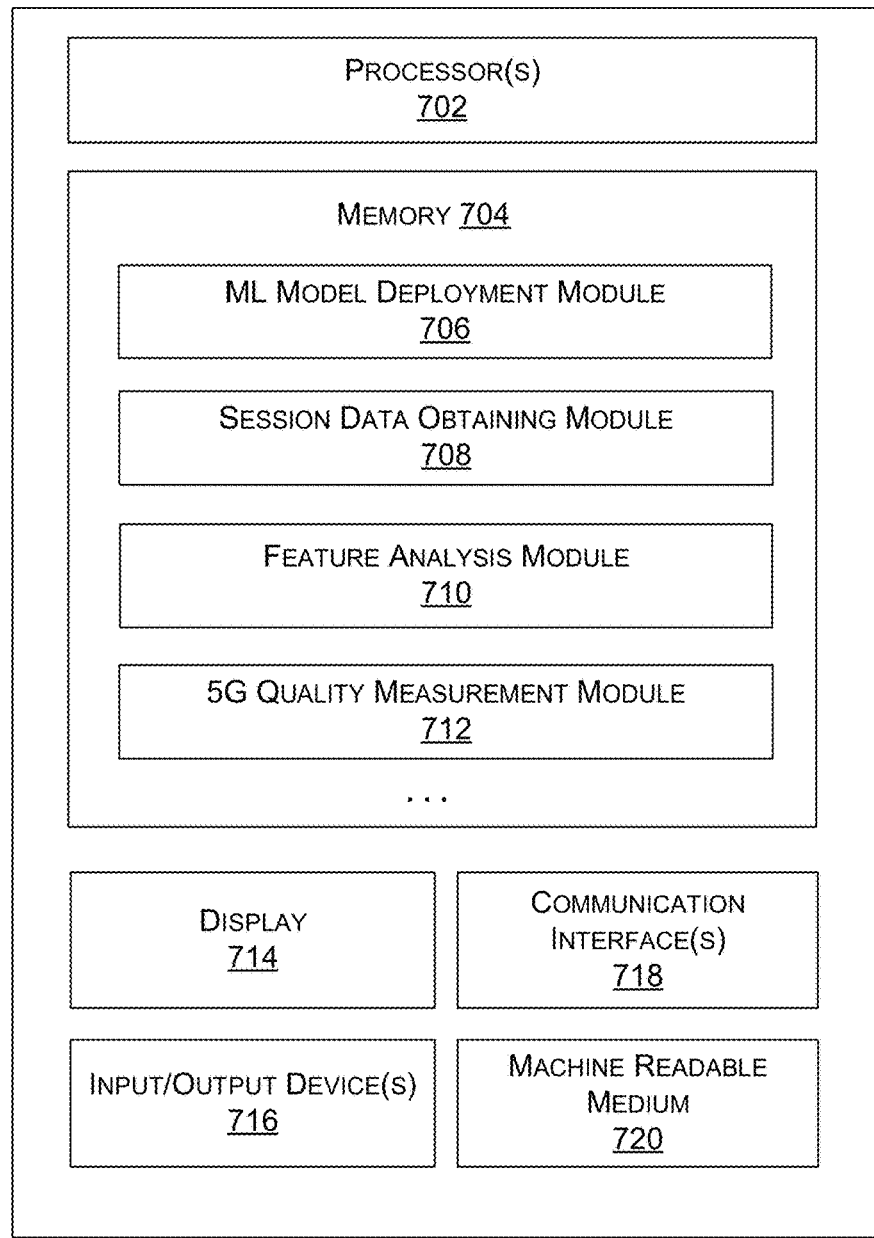
FIG. 7 illustrates an example computer server, in which methods for 5G quality measurement, according to an example of the present disclosure.

FIG. 7 illustrates an example computer server, in which methods for 5G quality measurement, according to an example of the present disclosure. The example computer server 700 may correspond to the quality assessment server 116, as illustrated in FIG. 1.

As illustrated in FIG. 7, a computer server 700 may comprise processor(s) 702, a memory 704 storing a machine learning model deployment module 706, a session data obtaining module 708, a feature analysis module 710, and a 5G quality measurement module 712, a display 714, input/output device(s) 716, communication interface(s) 718, and/or a machine readable medium 720.

In various examples, the processor(s) 702 can be a central processing unit (CPU), a graphics processing unit (GPU), or both CPU and GPU, or any other type of processing unit. Each of the one or more processor(s) 702 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 702 may also be responsible for executing all computer applications stored in memory 704, which can be associated with common types of volatile (RAM) and/or nonvolatile (ROM) memory.

In various examples, the memory 704 can include system memory, which may be volatile (such as RAM), non-volatile (such as ROM, flash memory, etc.) or some combination of the two. The memory 704 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computer server 700. Any such non-transitory computer-readable media may be part of the computer server 700.

The ML model deployment module 706 may be configured to obtain the trained ML model from a training server (e.g., the training server 114 of FIG. 1) and install the ML model for real-time quality measurement. Although shown as separate elements, the training server 114 and the quality assessment server 116, in some examples, may be integrated in one computer server. In such circumstances, the ML model deployment module 706 may also be configured to perform ML model trainings.

The session data obtaining module 708 may be configured to obtain the real-time session data from one or more network functions and/or entities of the 5G core network and/or the 4G EPC network such as AMF/MME, SMF/PGW, etc. Alternatively, or additionally, the session data obtaining module 708 may be configured to obtain the session data stored in a data storage located in the telecommunication network.

The feature analysis module 710 may be configured to determine a set of features from the hourly sessions. In some examples, the feature analysis module 710 may determine a set of more important features to be used for network performance measurement. In some other examples, the feature analysis module 710 may determine the features based on one or more particular sessions in an hour, e.g., 5G sessions prior to the last 5G disablement in the day. The feature analysis module 710 may determine the features based on aggregated data for all the sessions in the hour.

The 5G quality measurement module 712 may be configured to take the features provided by the feature analysis module 710 as inputs to the machine learning model deployed by the ML model deployment module 706. The 5G quality measurement module 712 may obtain the output from the machine learning model that indicates an hourly prediction on the likelihood each 5G active subscriber will disable 5G due to poor network experience. In some examples, the 5G quality measurement module 712 may generate an overall hourly prediction on the likelihood all 5G active subscribers will disable 5G due to poor network experience. Further, the 5G quality measurement module 712 may generate a monthly 5G quality indicator score based on the hourly predictions for all 5G active subscribers in one month.

The communication interface(s) 718 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 718 can be compatible with multiple radio access technologies, such as 5G radio access technologies and 4G/LTE radio access technologies. Accordingly, the communication interfaces 718 can allow the computer server 700 to connect to the 5G system described herein.

Display 714 can be a liquid crystal display or any other type of display commonly used in the computer server 700. For example, display 714 may be a touch-sensitive display screen and can then also act as an input device or keypad, such as for providing a soft-key keyboard, navigation buttons, or any other type of input. Input/output device(s) 716 can include any sort of output devices known in the art, such as display 714, speakers, a vibrating mechanism, and/or a tactile feedback mechanism. Input/output device(s) 716 can also include ports for one or more peripheral devices, such as headphones, peripheral speakers, and/or a peripheral display. Input/output device(s) 716 can include any sort of input devices known in the art. For example, input/output device(s) 716 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 720 can store one or more sets of instructions, such as software or firmware, that embodies any one or more of the methodologies or functions described herein. The instructions can also reside, completely or at least partially, within the memory 704, processor(s) 702, and/or communication interface(s) 718 during execution thereof by the computer server 700. The memory 704 and the processor(s) 702 also can constitute machine readable media 720.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, are not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system for evaluating fifth generation (5G) communication quality, the system comprising:
   one or more processors;
   a non-transitory computer-readable memory storing computer-executable instructions that, when executed by the one or more processors, cause the system to:
   determine a plurality of subscribers that each corresponding user equipment carries at least one session on 5G new radio (NR) in a first time period; and
   for each subscriber,
   obtain data associated with second sessions carried on the corresponding user equipment during the first time period;
   extract, from the data, one or more features associated with the second sessions; and
   determine, using a machine learning model and based at least in part on the one or more features, a value being indicative of a likelihood that each subscriber is having a poor 5G network experience during the first time period,
   wherein the machine learning model is trained by performing operations including:
   determining a first set of subscribers, each of which, disabled 5G on corresponding user equipment at least once in a day;
   obtaining, from a data storage, a first set of hourly session data carried on the corresponding user equipment of the first set of subscribers in the day;
   identifying, from the first set of hourly session data, an hour session data prior to disabling 5G;
   labeling the hour session data with a first indicator; and
   labeling other hour session data prior to the hour session data in the first set of hourly session data with a second indicator different from the first indicator.

2. The system of claim 1, wherein the computer-executable instructions, when executed by the one or more processors, cause the system further to:
   determine, based at least in part on the value, a 5G communication quality score of the plurality of subscribers in a second time period.

3. The system of claim 1, wherein the first time period is one hour, and the computer-executable instructions, when executed by the one or more processors, cause the system further to:
   determine the value being indicative of the likelihood that each subscriber is having a poor 5G network experience every one hour.

4. The system of claim 1, wherein the machine learning model is trained by performing operations further including:
   determining a second set of subscribers, each of which, kept 5G active on corresponding user equipment an entire day;

obtaining, from the data storage, a second set of hourly session data carried on the corresponding user equipment of the second set of subscribers during the entire day; and labeling each hourly session data of the second set of hourly session data with the second indicator.

5. The system of claim 4, wherein the machine learning model is trained by performing operations further including:

generating training data by combining the first set of hourly session data and the second set of hourly session data;

generating a training set from the training data;

extracting one or more second features from the training set;

inputting the one or more second features to the machine learning model; and obtaining an output from the machine learning model, the output being indicative of a probability that the subscribers were having poor 5G network experiences in a past time period.

6. The system of claim 5, wherein the machine learning model is trained by performing operations further including:

generating a validation set from the training data; and validating the output of the machine learning model using the validation set.

7. The system of claim 1, wherein the one or more features include at least one of:

a location of the user equipment, a time associated with the second sessions, whether the user equipment is using a standalone (SA) mode or a one-standalone (NSA) mode, a type of radio access technology (RAT), a packet latency from the user equipment to a domain name server (DNS), per cell measurement data, or an original equipment manufacturer (OEM) of the user equipment.

8. A computer implemented method, comprising:

determining a plurality of subscribers that each corresponding user equipment carries at least one session on 5G new radio (NR) in a first time period; and for each subscriber, obtaining data associated with second sessions carried on the corresponding user equipment during the first time period;

extracting, from the data, one or more features associated with the second sessions; and determining, using a machine learning model and based at least in part on the one or more features, a value being indicative of a likelihood that each subscriber is having a poor 5G network experience during the first time period, wherein the machine learning model is trained by:

determining a first set of subscribers, each of which, disabled 5G on corresponding user equipment at least once in a day:

obtaining, from a data storage, a first set of hourly session data carried on the corresponding user equipment of the first set of subscribers in the day;

identifying, from the first set of hourly session data, an hour session data prior to disabling 5G;

labeling the hour session data with a first indicator; and labeling other hour session data prior to the hour session data in the first set of hourly session data with a second indicator different from the first indicator.

9. The computer implemented method of claim 8, further comprising:

determining, based at least in part on the value, a 5G communication quality score of the plurality of subscribers in a second time period.

10. The computer implemented method of claim 8, further comprising:

determining the value being indicative of the likelihood that each subscriber is having a poor 5G network experience every one hour.

11. The computer implemented method of claim 8, further comprising training the machine learning model is trained by:

determining a second set of subscribers, each of which, kept 5G active on corresponding user equipment an entire day;

obtaining, from the data storage, a second set of hourly session data carried on the corresponding user equipment of the second set of subscribers during the entire day; and labeling each hourly session data of the second set of hourly session data with the second indicator.

12. The computer implemented method of claim 11, further comprising training the machine learning model by:

generating training data by combining the first set of hourly session data and the second set of hourly session data;

generating a training set from the training data;

extracting one or more second features from the training set;

inputting the one or more second features to the machine learning model; and obtaining an output from the machine learning model, the output being indicative of a probability that the subscribers were having poor 5G network experiences in a past time period.

13. The computer implemented method of claim 12, further comprising training the machine learning model by:

generating a validation set from the training data; and validating the output of the machine learning model using the validation set.

14. The computer implemented method of claim 8, wherein the one or more features include at least one of:

a location of the user equipment, a time associated with the second sessions, whether the user equipment is using a standalone (SA) mode or a one-standalone (NSA) mode, a type of radio access technology (RAT), a packet latency from the user equipment to a domain name server (DNS), per cell measurement data, or an original equipment manufacturer (OEM) of the user equipment.

15. One or more non-transitory computer-readable storage media storing computer-readable instructions, that when executed by one or more processors, cause the one or more processors to perform operations including:

determining a plurality of subscribers that each corresponding user equipment carries at least one session on 5G new radio (NR) in a first time period; and for each subscriber, obtaining data associated with second sessions carried on the corresponding user equipment during the first time period;

extracting, from the data, one or more features associated with the second sessions; and determining, using a machine learning model and based at least in part on the one or more features, a value being indicative of a likelihood that each subscriber is having a poor 5G network experience during the first time period, wherein the machine learning model is trained by performing operations including:

determining a first set of subscribers, each of which, disabled 5G on corresponding user equipment at least once in a day;

obtaining, from a data storage, a first set of hourly session data carried on the corresponding user equipment of the first set of subscribers in the day;

identifying, from the first set of hourly session data, an hour session data prior to disabling 5G;

labeling the hour session data with a first indicator; and labeling other hour session data prior to the hour session data in the first set of hourly session data with a second indicator different from the first indicator.

16. The one or more non-transitory computer-readable storage media of claim 15, wherein the machine learning model is trained by performing operations further including:

determining a second set of subscribers, each of which, kept 5G active on corresponding user equipment an entire day;

obtaining, from the data storage, a second set of hourly session data carried on the corresponding user equipment of the second set of subscribers during the entire day; and labeling each hourly session data of the second set of hourly session data with the second indicator.

17. The one or more non-transitory computer-readable storage media of claim 16, wherein the machine learning model is trained by performing operations further including:

generating training data by combining the first set of hourly session data and the second set of hourly session data;

generating a training set from the training data;

generating a validation set from the training data;

extracting one or more second features from the training set;

inputting the one or more second features to the machine learning model;

obtaining an output from the machine learning model, the output being indicative of a probability that the subscribers were having poor 5G network experiences in a past time period; and validating the output of the machine learning model using the validation set.

* * * * *